310-10 SR
F213A XR 3,201,765

Aug. 17, 1965 J. PEARL 3,201,765

APPARATUS, WITHOUT MOVING PARTS, FOR MOVING A STORAGE AREA ALONG A STORAGE MEDIUM

Filed Aug. 16, 1963

INVENTOR.
JUDEA PEARL

BY

Attorney 3,201,765

APPARATUS, WITHOUT MOVING PARTS, FOR MOVING A STORAGE AREA ALONG A STORAGE MEDIUM

Judea Pearl, New Brunswick, N.J., assignor to Radio Corporation of America, a corporation of Delaware Filed Aug. 16, 1963, Ser. No. 302,498
14 Claims. (Cl. 340—173.1)

This invention relates to cryoelectric circuits, and particularly to superconductor circuits which are useful in data processing applications such as memories, shift registers, analog-to-digital converters and the like and in other applications such as oscillators, integrators and so on.

The arrangement of the invention includes a length of superconductor material and means for establishing a persistent current in a restricted area of this material. Electrical control means coupled to the material causes (persistent current established in) a restricted area to move along the length of the superconductor material. This control means may take the form of means for applying a current to the length of superconductor material in a direction perpendicular to the length of the superconductor material.

The invention is discussed in greater detail below and is illustrated in the following drawings of which:

In the discussion which follows, it is assumed that the apparatus of the invention is maintained in a low temperature environment, such as at a temperature of a few degrees Kelvin, at which superconductivity is possible. The means for doing this is well known and is not illustrated.

Figure 1:
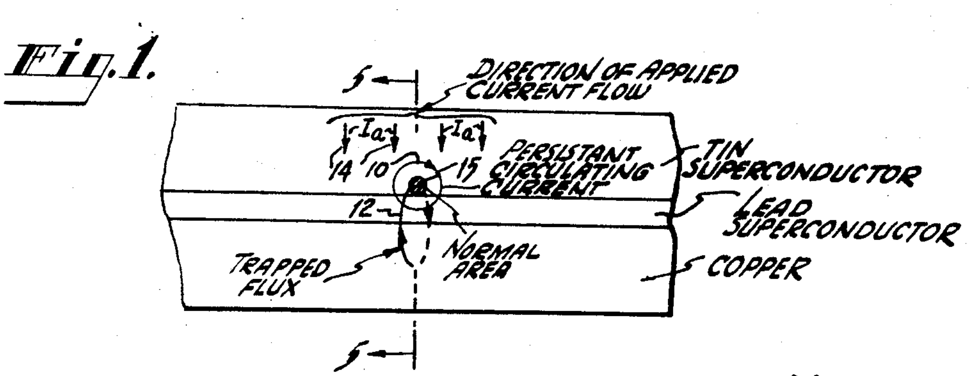
FIG. 1 is a plan view to illustrate one form of the invention.

The apparatus of FIG. 1 includes three strip shaped lengths of conductor films. There is first a "soft" superconductor such as tin and next a "hard" superconductor such as lead and next a conductive material which is not normally a superconductor, such as copper. The terms soft and hard, as understood in the art, can refer to the temperature and magnetic field at which the superconductor material changes from its "normal" state, that is, its resistive condition, to its superconducting state. A soft superconductor becomes superconductive at a substantially lower temperature and lower field than a hard superconductor.

In the operation of the arrangement of FIG. 1, a persistent circulating current is first established in a restricted area of the tin film. This may be accomplished by placing a small exciting coil preferably next to the lead film and applying a current to the coil of sufficient magnitude to drive the portion of the tin film adjacent to the lead film from its superconducting to its normal state. This is shown in more detail in FIG. 5. The exciting current magnitude is sufficient to cause the resulting magnetic field to penetrate first through the lead then through the tin and copper. When the current is removed, the trapped flux 12 remains and a persistent circulating current flows in the tin as is indicated by the arrow 10 in FIG. 1. The magnetic field associated with the persistent current, that is, the trapped flux 12, is perpendicular to the film, where it enters the film and passes through the normal area 15 around which the persistent current flows, and returns through the copper film. The field cannot return through the superconducting regions of the tin or through the lead since any superconductor in its superconducting condition acts like a perfect shield to a magnetic field.

As previously mentioned, a temperature is assumed which is sufficient to maintain both the lead and tin superconducting. The persistent current which flows around the normal area 15 shown in FIG. 1 is restricted to the tin and lead film since these films have zero resistance. This current does not pass into the copper because the copper is always normal (always has some finite value of resistance) and cannot support a flow of persistent current.

The current density along the edge of the normal area 15 is just below that which is necessary to make the tin normal. Since lead is "harder" than tin, the current density required to make the lead normal is higher than the current density required to make the tin normal. Therefore, the lead film always remains superconducting. It is because of this and because of the principle that a superconductive system always assumes the minimum possible energy state, that the normal area about which the persistent current flows always remains in the tin and adjacent to the tin-lead interface. The minimum energy state for a superconductor system implies the shortest possible path length for any magnetic flux which is trapped. If the persistent circulating current region attempts to move away from the lead-tin interface and into the tin, the path length of the trapped flux would have to increase because this flux would be unable to enter the lead (recall that the lead remains a superconductor and acts like a magnetic field shield). This increase in path length would mean an increase in energy of the system. This is not permitted by the minimum energy state principle and therefore does not occur. And, as shown above, since lead is "harder" than tin and cannot be made normal by the persistent current flow about the normal area, the normal area cannot move into the lead. Therefore, the normal area must remain confined to the tin and adjacent to the tin-lead interface.

Figure 2:
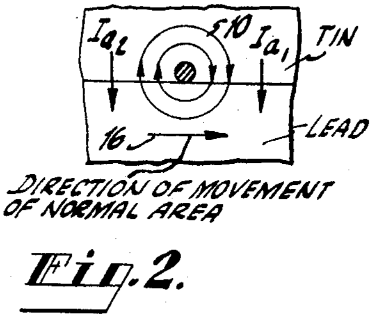
FIG. 2 is an enlarged view of a portion of FIG. 1.

If a current $I_a$, indicated schematically by the arrows 14, is applied to the film structure of FIG. 1, in a direction perpendicular to the longitudinal axis of the strips and parallel to the surface of the strips, it will cause the persistent circulating current area to move along the length of the strip. This is illustrated most clearly in FIG. 2. The current $I_{a1}$ at the right side of the persistent circulating current area adds to the circulating current 10. As previously mentioned, the amount of circulating current which flows is close to the critical current of the tin film in the area immediately adjacent to the normal area. The sum of the current $I_{a1}$ and the circulating current is therefore sufficient to drive a small area to the right of the normal area normal. By the same token, the current $I_{a2}$ is in a direction opposite to the circulating current 10. Therefore, it drives a small portion of the normal area at the left edge of the normal area from its normal to its superconducting condition. The net effect therefore of the current $I_{a1}$, $I_{a2}$ is to cause the normal area to move to the right, as is indicated by the arrow 16. The persistent current, which continues to circulate around the normal area, moves also to the right. But, the normal area, during its movement, is constrained to a path defined by the tin-lead interface.

The speed at which the persistent circulating current area moves is a function of the magnitude of the control current $I_a$. It is also clear that the direction in which the persistent circulating area moves is a function of a polarity of the control current $I_a$. If the control current $I_a$ is in the form of a pulse, the persistent current area moves a discrete distance, proportional to the pulse amplitude and duration, and then stops. Further, as already indicated in the previous explanation, the persistent circulating current area continues to remain immediately adjacent to the interface between the tin and lead strip so that this interface essentially acts as a guide for the movement of the persistent current area. The amount of magnetic flux initially established (that is, the magnetic flux $\phi$ associated with the persistent circulating current) is always conserved since it cannot escape through the superconducting film surrounding the normal area.

Figure 3:
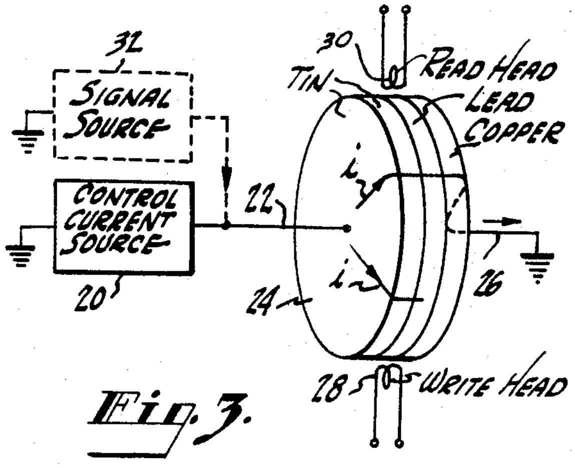
FIG. 3 is a diagram of another form of the present invention.

In the arrangement of FIG. 3, the tin, lead and copper film strips form the surface of a circular cylinder and the control current I is applied to this surface in a direction parallel to the axis of the cylinder, by the control current source 20. This current flows through conductor 22 to the tin surface 24 at the end of the cylinder, over the tin, lead and copper surface of the cylinder, then over the opposite end of the cylinder which may be formed of copper or tin, and then through conductor 26 to ground. The body of the cylinder beneath its surface is preferably an insulator to lessen eddy current losses. Information may be written on the cylindrical surface by the write head 28 and may be read from the surface by the read head 30. While illustrated as two heads, it should be appreciated that a single read-write head may be used instead.

The system of FIG. 3 is useful in many different applications. In the operation of the system, a persistent circulating current is established in a restricted area of the tin film immediately adjacent to the lead film by applying a write current to the write head. If now a direct current is applied by the control current source 20, this persistent current area will continuously circulate around the cylindrical surface. The interface between the lead and tin strips acts as a guide for this circulating persistent current area causing it to travel along a circumferential line. When the persistent current area passes under the read head, the magnetic lines of flux associated with the persistent current area induce a "read" current in the read head. This current may be applied to an amplifier or the like (not shown). This current is an alternating current and its frequency depends upon the amplitude of the control current from source 20. Accordingly, the arrangement just described is an oscillator, that is, an applied direct current produces an alternating current output.

In the use of the system of FIG. 3 just described, it was stated that one persistent current area was established in the tin strip. However, if desired, a plurality of such areas may be established along the circumferential length of the tin strip. This may be accomplished by pulsing the write head during the time the control current source 20 applies a direct current. Each write pulse should have an amplitude sufficient to drive the area beneath the write head normal. The normal area thereby established can be of very small size so that the packing density possible for these persistent circulating current areas is quite high. With many circulating current areas established along the tin strip, the operating frequency for the system, when operating as an oscillator, can be quite high. As an example, for a given value of control current supplied by source 20, if there are 10 equally spaced persistent circulating current areas along the cylindrical surface of the tin strip, then the operating frequency obtained is 10 times that for the case in which a single persistent circulating current area is present along the tin strip.

The arrangement of FIG. 3 is also useful as a frequency modulator. In this use, the control current source 20 applies a direct current to the cylinder. In addition, a current which varies in amplitude in accordance with some intelligence, is also applied to the conductor 22 from a signal source such as illustrated by dashed block 32. The output obtained at the read head is a frequency modulated signal, the carrier frequency being proportional to the direct current applied by source 20.

In another use of the arrangement of FIG. 3, the source 20 may apply an alternating current to the system. In this case, the persistent current area or areas will move back and forth along the tin strip. This will cause the read-head to have an alternating current induced therein. If many persistent current areas are present, the system acts as a frequency multiplier.

In the operation of the arrangement of FIG. 3 as a shift register, binary bits may be written along the tin strip by applying pulses to the write head. The binary bit "one" may be represented by a persistent current area and may be written into the tin strip by means of a write pulse applied to the write head. The binary bit "zero" may be represented by the absence of a persistent current area. The persistent current area may be shifted along the length of the tin strip by control current pulses applied by a source 20. A pulse of given duration and magnitude causes the persistent current area to move along the strip a given distance.

In the use of the arrangement of FIG. 3 as an analog-to-pulse count converter, the analog quantity is applied as a current pulse on lead 22. The current pulse duration is some fixed value and the current pulse amplitude is proportional to the analog quantity. Again, one or more persistent current areas may be equally spaced along the length of the tin strip. The frequency of the alternating current induced in the read head is proportional to the amplitude of the control current pulse, that is, proportional to the analog quantity. This alternating current may be converted to a count by well known means such as a differentiating circuit and counter or the like.

Figures 4, 5:
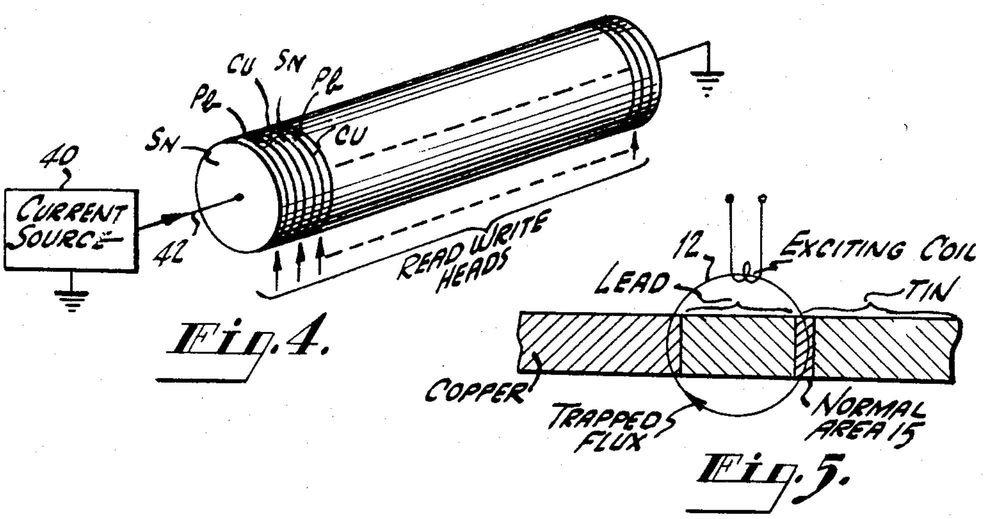
FIG. 4 is a diagram of a third form of the invention.
FIG. 5 is a section along line 5—5 of FIG. 1.

FIG. 4 illustrates an embodiment of the invention which is analogous to a drum memory. However, the drum in the present instance is stationary. The drum consists of a plurality of circumferential strips of tin, lead and copper as shown. Each group of such strips has associated with it a read-write head or, if desired, each group can have associated with it one read head and one separate write head. Binary digits ("bits") are written onto each tin strip, which is analogous to a track on a drum, by applying pulses to the write heads. During the time the pulses are applied, current is applied from source 40 to the drum circumference via lead 42. This causes the bits being written into the drum to circulate along their respective tracks around the drum circumference. If the current applied by the source is a direct current, the bits move along their respective track at some fixed speed which is proportional to the magnitude of the current. This is analogous to the physical rotation of the drum. However, one advantage of the present system is that the drum can remain stationary so that there is no problem of mounting and driving a drum shaft or other analogous problems.

Rather than supplying a direct current, the current source 40 may apply current pulses at some fixed frequency. Each current pulse will cause the stored bits (the restricted persistent current areas) to move through some fixed distance along the drum circumference and then to remain at their new locations until the next pulse from source 40 is applied.

The amplifiers or other well known equipment associated with drums is not discussed here in detail. Also, it is to be understood that, if desired, one or more of the tracks on the present drum may be employed for timing purposes analogously to the clock pulse tracks on a magnetic drum.

In the operation of the system of the invention as a shift register or as a drum memory, and in other applications, it is sometimes desirable to be able to erase the stored information. This may be accomplished by applying to the write head a current pulse of opposite polarity to the pulse employed for writing information. The amplitude of the erase current pulse should be just sufficient to reduce the peristent circulating current stored to zero or to a relatively small value. Preferably, the amplitude of erase current pulse should not be so great as to change the direction of persistent circulating current flow as this would cause the persistent current area, when caused to move, to travel along its track in a direction opposite from the other persistent current areas.

In the embodiments of the invention illustrated, the materials employed are tin, lead and copper. It is to be understood that these are merely illustrative and are not to be taken as limiting as many other materials may be employed instead. The only requirements are that the film corresponding to the tin be a softer superconductor than the film corresponding to the lead. Further, it is desirable that the film corresponding to the copper have relatively good electrical conductivity. Some examples of superconductor materials, any two of which may be used to provide an appropriate interface, are: indium, niobium, tantalum, vanadium and alloys of these materials. Some examples of suitable conductors other than copper are gold and silver.

In the embodiment of the invention illustrated, the stored persistent currents are caused to move along their respective tracks by applying a current directly to the films. Other means for causing movement of the restricted areas are possible. For example, one can employ leads extending parallel to the drum surface in the example of FIG. 4 and apply currents to these leads for producing magnetic fields. These magnetic fields will induce currents on the cylinder surface which will cause the restricted persistent current areas to move given amounts in the desired direction.

The systems of the invention can be made quite small. For example, the widths of the tin, lead and copper strips may be of the order of several thousand Angstroms each. It is also possible to use strips much wider than this.

What is claimed is:

1. In combination,
a length of superconductor material;
means for establishing a persistent current in a restricted area of said material; and
electrical means coupled to said material for causing the restricted area in which persistent current flows to move along the length of the superconductor material.

2. In combination,
a length of superconductor material;
means for establishing a persistent current in a restricted area of said material; and
means coupled to said material for applying a current thereto in a direction perpendicular to the length dimension of the superconductor material for causing the restricted area in which persistent current flows to move along the length of the superconductor material.

3. In combination,
a length of superconductor film;
means for establishing a persistent current in a restricted area of said film; and
means for applying a current to the film which flows parallel to the film surface and perpendicular to the length dimension of the film for causing the restricted area in which persistent current flows to move along the length of the superconductor film.

4. In combination,
a length of superconductor material which comprises a length of hard superconductor joined at one edge to a length of soft superconductor;
means for establishing a persistent current in the hard and soft superconductors, which current circulates around a restricted area of said length of soft superconductor adjacent to the edge at which the hard and soft superconductors are joined; and
electrical means coupled to said length of superconductor material for causing the restricted area in which persistent current flows to move along the length of the soft superconductor.

5. In combination, a loop of superconductor material which comprises a loop of hard superconductor joined along one entire edge to a loop of soft superconductor;
means for establishing a persistent current in a restricted area of said loop of superconductor material adjacent to the edge at which the soft and hard materials are joined; and
electrical means coupled to said loop of superconductor material for causing the restricted area in which persistent current flows to move along the peripheral surface of the loop of superconductor material.

6. In combination,
a cylinder, the circumferential surface of which includes three side-by-side annular elements surrounding the axis of the cylinder, the center element being joined at its two opposite edges to the outer elements, the center element being formed of a hard superconductor, one outer element being formed of a soft superconductor and the other outer element being formed of a metal which is not superconducting;
means for establishing a persistent current in a restricted area of said cylinder, which current circulates about a center located in the soft superconductor element adjacent to the edge at which the superconductor element is joined to the hard superconductor element; and
means coupled to said cylinder for causing the center about which the persistent current circulates to move along the soft superconductor element around the axis of the cylinder.

7. In combination,
a cylinder, the circumferential surface of which includes three side-by-side annular elements surrounding the axis of the cylinder, the center element being joined at its two opposite edges to the outer elements, the center element being formed of a hard superconductor, one outer element being formed of a soft superconductor and the other outer element being formed of a metal which is not superconducting;
means for establishing a persitsent current in a restricted area of said hand and soft superconductor elements which circulates around a center located in a soft superconductor element adjacent to the edge at which the soft superconductor element is joined to the hard superconductor element;
means coupled to said cylinder for causing the center of the restricted area in which persistent current flows to move along the soft superconductor element around the axis of the cylinder; and
a pick-up means adjacent to said circumferential surface and responsive to the movement past the pick-up means of the trapped flux associated with the persistent current area.

8. In combination,
a hard superconductor element joined at one edge to a soft superconductor element; and
means for causing magnetic flux to pass through the soft superconductor element and to link the hard superconductor element and thereby to establish persistent current flow in the hard and soft superconductor elements around a restricted area of said soft superconductor adjacent to said edge at which said two elements are joined.

9. A cryoelectric circuit comprising,
a strip of a soft superconductor, a strip of a hard superconductor, and a strip of metal which is not a superconductor, said three strips being joined to one another along their long edges, in the order named; and
means for establishing a persistent circulating current in a region of the soft and hard superconductors adjacent to the interface between the soft and hard superconductors.

10. A cryoelectric circuit comprising,
a strip of a soft superconductor, a strip of a hard superconductor and a strip of metal which is not a superconductor, said three strips being joined to one another along their long edges, in the order named; and magnetic field producing means for causing magnetic flux to pass through the soft superconductor to link the hard superconductor and to return to the soft superconductor through the metal which is not a superconductor to thereby establish a persistent circulating current in a region of the soft and hard superconductors adjacent to the interface between the soft and hard superconductors.

11. A cryoelectric circuit comprising, a strip of a soft superconductor, a strip of a hard superconductor and a strip of metal which is not a superconductor, said three strips being joined to one another along their long edges, in the order named;

means for establishing a persistent circulating current in a region adjacent to the interface between the soft and hard superconductors by causing flux to be trapped around the hard superconductor; and means for passing a current through the three strips in a direction at an angle to the length dimension of the strips to thereby cause the persistent current region to move along said interface.

12. A cryoelectric circuit comprising, a strip of a soft superconductor, a strip of a hard superconductor and a strip of metal which is not a superconductor, said three strips being joined to one another along their long edges, in the order named;

means for establishnig a persistent circulating current in a region adjacent to the interface between the soft and hard superconductors by causing flux to be trapped around the hard superconductor;

means for passing a current through the three strips in a direction substantially at right angles to the length dimension of the strips to therebyb cause the persistent current region to move along said interface; and magnetic field pick-up means located next to said hard superconductor.

13. In combination, a stationary drum having circumferential superconductive storage tracks about its surface;

means coupled to the drum and responsive to signals indicative of binary digits for establishing persistent currents at discrete areas of the drum surface along said tracks to effect the storage of said digits; and means coupled to said drum for causing the discrete persistent current areas to move along said tracks while the drum remains stationary.

14. In combination, a stationary drum having circumferential superconductive storage tracks about its surface, each said track being defined by the interface between a hard and a soft superconductor;

means coupled to the drum and responsive to signals indicative of binary digits for establishing persistent currents at discrete means of the drum surface along said tracks to effect the storage of the said digits; and means coupled to said drum for causing the discrete persistent current areas to move along said tracks while the drum remains stationary.

References Cited by the Examiner

UNITED STATES PATENTS 2,919,432 12/59 Broadbent ------------ 340—174

IRVING L. SRAGOW, *Primary Examiner.*

UNITED STATES PATENT OFFICE
CERTIFICATE OF CORRECTION

Patent No. 3,201,765 August 17, 1965

Judea Pearl

It is hereby certified that error appears in the above numbered patent requiring correction and that the said Letters Patent should read as corrected below.

Column 6, line 25, after "the", second occurrence, insert -- soft --; column 8, line 23, for "means" read -- areas --.

Signed and sealed this 31st day of May 1966.

(SEAL)
Attest:

ERNEST W. SWIDER
Attesting Officer

EDWARD J. BRENNER
Commissioner of Patents